US009641611B2

(12) United States Patent
Chippa et al.

(10) Patent No.: US 9,641,611 B2
(45) Date of Patent: May 2, 2017

(54) LOGICAL INTERFACE ENCODING

(71) Applicant: INTERNATIONAL BUSINESS MACHINES CORPORATION, Armonk, NY (US)

(72) Inventors: Ashok N. Chippa, Mountain View, CA (US); Ioana M. Costea, San Jose, CA (US); Vijoy A. Pandey, San Jose, CA (US); Daljeet Singh, Watsonville, CA (US); Ethan M. Spiegel, Mountain View, CA (US)

(73) Assignee: International Business Machines Corporation, Armonk, NY (US)

( * ) Notice: Subject to any disclaimer, the term of this patent is extended or adjusted under 35 U.S.C. 154(b) by 347 days.

(21) Appl. No.: 14/320,586

(22) Filed: Jun. 30, 2014

(65) Prior Publication Data
US 2015/0381560 A1 Dec. 31, 2015

(51) Int. Cl.
*H04L 29/08* (2006.01)
*H04L 29/12* (2006.01)

(52) U.S. Cl.
CPC ........ *H04L 67/1095* (2013.01); *H04L 61/103* (2013.01)

(58) Field of Classification Search
CPC .......................... H04L 61/103; H04L 67/1095
See application file for complete search history.

(56) References Cited

U.S. PATENT DOCUMENTS

| 6,895,013 B1* | 5/2005 | Burns | H04L 47/10 370/401 |
|---|---|---|---|
| 7,466,698 B2* | 12/2008 | Ishwar | H04L 12/4641 370/389 |
| 2004/0139240 A1* | 7/2004 | DiCorpo | G06F 3/0617 710/3 |
| 2004/0165581 A1* | 8/2004 | Oogushi | H04L 12/2856 370/352 |
| 2006/0212924 A1* | 9/2006 | Xie | H04L 63/102 726/1 |
| 2008/0225853 A1* | 9/2008 | Melman | H04L 12/4625 370/392 |

(Continued)

OTHER PUBLICATIONS

Openstack, Network Service Diablo, https://wiki.openstack.org/wiki/NetworkServiceDiablo, Dec. 12, 2013.

*Primary Examiner* — Joe Chacko
(74) *Attorney, Agent, or Firm* — Matthew C. Zehrer

(57) ABSTRACT

A networking system, and more particularly an interface management subsystem, offers logical interface abstraction for networking system software. The networking system generally transmits data via a hardware interface. All software components in the control and forwarding plane use a Logical Interface (LIF) that is a logical representation of the hardware interface. A mapping occurs between the LIF and hardware interface used to transmit the data. Each LIF is represented by an LIF identifier used to store and retrieve logical interface records to and from shared memory accessible to all protocols and applications in the control and forwarding plane. The efficient storage and retrieval of such logical interface records allows for a global unique view of network interfaces, avoidance of data replication in each networking system software application's memory space, etc.

9 Claims, 6 Drawing Sheets

(56) References Cited

U.S. PATENT DOCUMENTS

| | | | |
|---|---|---|---|
| 2010/0238837 A1* | 9/2010 | Zheng | H04L 12/2876 370/254 |
| 2011/0004791 A1* | 1/2011 | Kokubu | G06F 11/0751 714/57 |
| 2011/0085558 A1* | 4/2011 | Gnanasekaran | H04L 45/583 370/401 |
| 2013/0073821 A1* | 3/2013 | Flynn | G06F 3/061 711/162 |
| 2013/0294231 A1* | 11/2013 | Nodir | H04L 49/70 370/230 |
| 2014/0355445 A1* | 12/2014 | Dong | H04L 47/125 370/235 |

* cited by examiner

LOGICAL INTERFACE ENCODING

FIELD OF THE INVENTION

Embodiments of the invention generally relate to networking systems and more particularly to an information interface management subsystem that offers logical interface abstraction to networking systems software.

DESCRIPTION OF THE RELATED ART

A networking system may respond to requests across a network to provide, or help to provide, a network service. In many cases, the networking system can provide several services and have several instances in operation. With respect to software of networking systems, it is beneficial to represent hardware resources in a platform independent way. This makes the software portable to other platforms. To achieve the platform independence, the software uses logical representation of hardware resources and implements the mapping between the two. It is beneficial that the mapping is efficient in terms of performance and storage requirements.

An example of the logical to physical mapping is the interface management subsystem. The interface management subsystem provides a logical interface (LIF) abstraction to applications and hides all internal platform details from them.

The software of the networking system may be organized into the following layers: management layer, control plane layer and forwarding plane layer. The management layers allow users or other management systems to configure the networking system and its resources. The control plane layer consists of various applications and protocols that receive various data abstracted information from other data networking systems. The forwarding plane layer receives local state information from the control plane layer and uses this state along with the packet headers to determine where to send the data traffic.

SUMMARY

In an embodiment of the present invention, a network system includes a interface record stored in memory accessible to the network control plane and the network forwarding plane, a logical interface (LIF) manager that maps a hardware interface to a LIF comprising an LIF identifier (LIF-ID), the LIF-ID comprising one or more entries that map to the interface record, and a processor that transmits network data based upon the interface record.

In another embodiment of the present invention, a method for transmitting network data includes: mapping, with the LIF manager, one or more hardware interfaces of a network device to respective LIFs, receiving, upon a first hardware interface communicatively connected to the network, data associated with the LIF and the LIF-ID, locating, with the network device, by querying an index entry comprised within the LIF-ID that points to an associated interface record stored within a memory accessible to the network control plane and the network forwarding plane, retrieving, with the network device, the associated interface record, and transmitting the received data to a second hardware interface of the network device utilizing the retrieved associated interface record.

In yet another embodiment, a computer program product for transmitting network data includes a computer readable storage medium having program instructions embodied therewith readable to map, with the LIF manager of the network device, one or more hardware interfaces of the network device to respective LIFs, receive, upon the first hardware interface of the network device, data associated with the LIF and the LIF-ID, locate, with the network device, by querying an index entry comprised within the LIF-ID that points to an associated interface record stored within the memory accessible to the network control plane and the network forwarding plane, retrieve, with the network device, the associated interface record, and transmit, with the network device, the received data to the second hardware interface of the network device utilizing the retrieved associated interface record.

These and other embodiments, features, aspects, and advantages will become better understood with reference to the following description, appended claims, and accompanying drawings.

DETAILED DESCRIPTION

Embodiments of the invention generally relate to a networking system and more particularly to an information interface management subsystem that offers logical interface abstraction to networking system software. The networking system generally transmits data via a hardware interface. All software components in the control and forwarding plane use a Logical Interface (LIF) that is a logical representation of the hardware interface. A mapping occurs between the LIF and hardware interface used to transmit the data. Each LIF includes an LIF identifier used to store and retrieve logical interface records to and from shared memory accessible to all protocols and applications in the control and forwarding plane. The efficient storage and retrieval of such logical interface records allows for a global unique view of network interfaces, avoidance of data replication in each networking system software application's memory space, etc.

Figure 1:
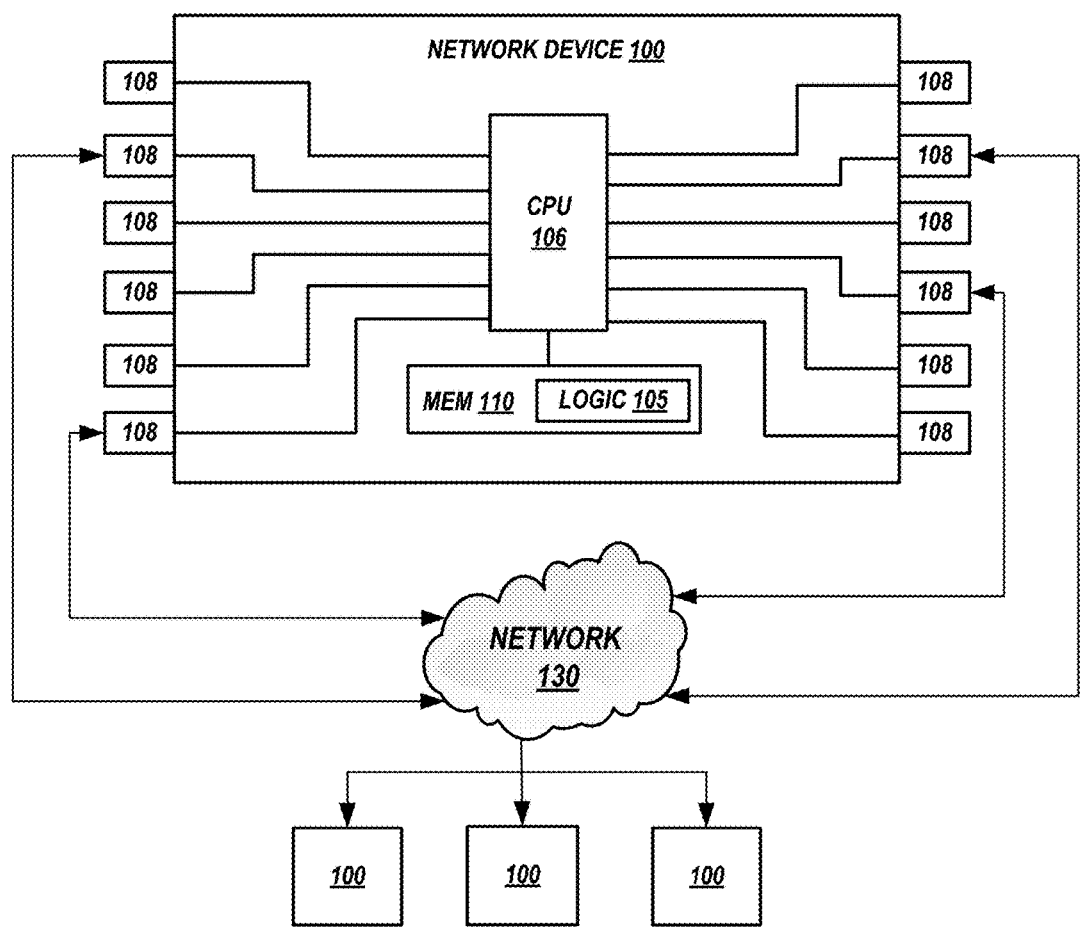
FIG. 1 depicts a high-level block diagram of an exemplary network device for implementing embodiments of the invention

Referring to the Drawings, wherein like numbers denote like parts throughout the several views, FIG. 1 depicts a high-level block diagram of an exemplary network device 100 for implementing embodiments of the invention. The network device 100 comprises one or more processors 106, such as a switching processor, etc., adapted to receive and transmit data, via hardware interfaces 108, from or to other devices (e.g. servers, user devices, and/or peripherals, other network devices 100, etc.) communicatively connected to the network device 100 by a network 130. In certain embodiments, a single processor 106 is configured to carry out the functionality of network device 100 or in other embodiments the network device 100 may include multiple processors 106 or processor types. Any type of processor known in the art may be used such as a central processing unit (CPU), a field programmable gate array (FPGA), an integrated circuit (IC), an application specific integrated circuit (ASIC), etc.

Processor 106 may include an arithmetic logic unit (ALU), which performs arithmetic and logical operations, and a control unit, which extracts instructions (e.g. logic 105, operating system, applications, etc.) from memory 110 and decodes and executes the instructions, calling on the ALU when required. Memory 110 may be any known storage device that allows for data to be stored and accessed by processor 106. For example, memory 110 may be RAM (e.g. SRAM, ROM, OTP, NOR flash, etc.), SRAM, DRAM, on board processor 106 cache, or other such equivalents used in association with processor 106.

The processor 106 includes or has access to logic 105 configured to create or utilize a control plane. The control plane is a component of network device 100 that focuses on how that network device 100 interacts with other devices within network 130. For example, the logic 105 configured to implement the control plane may include a routing information, such as a forwarding tables, etc. The creation of the control plane, interaction topologies, etc. may be accomplished by a first network device 100 and shared with other networking devices 100 to utilize. For example, control plane functions include the system configuration, management, and exchange of routing/forwarding table information; and the first network device 100 may exchange such topology information with other network device 100. The logic 105 configured to create or utilize a control plane also may feed a forwarding plane with what the forwarding plane needs to create its forwarding tables and updates topology changes as they occur.

The processor 106 includes or has access to logic 105 configured to create or utilize a forwarding plane. The forwarding plane, sometimes called the data plane, is the component of network device 100 that decides what to do with data arriving on an inbound hardware interface 108. For example, the logic 105 configured to create or utilize the forwarding plane may include a table in which the network device 100 looks up the destination address of the incoming data and retrieves the information necessary to determine the path from the receiving hardware interface 108, through the internal forwarding fabric of the network device 100, and to the proper outgoing hardware interface 108.

The processor 106 includes or has access to logic 105 configured to create and utilize an LIF associated with each hardware interface 108. The logic 105 configured to create and utilize the LIFs allows for first network device 100 program instructions within the control plane and second network device 100 program instructions within the forwarding plane to utilize the LIFs. The logic 105 configured to create and utilize the LIFs generates and stores LIF-IDs associated with each LIF to memory assessable to all protocols and applications in the control plane and forwarding plane. The logic 105 configured to create and utilize the LIFs may also store an interface record associated with each LIF-ID within the memory assessable to all protocols and applications in the control plane and forwarding plane. Further, the logic 105 configured to create and utilize the LIFs may retrieve the interface records utilizing the LIF identifier for efficient data transmission. The logic 105 configured to create and utilize the LIFs allows for a global unique view of network 130 interfaces, avoidance of data replication in each networking system 100 memory 110, etc.

The processor 106 includes or has access to logic 105 configured to map or link a LIF with a hardware interface 108. In additional embodiments, the processor 106 includes or has access to logic 105 configured for receiving at least one data packet having an LIF-ID via a hardware interface 108. The processor 106 utilizes the LIF-ID to query for an associated interface record to, for example, gather further information about the received data packet. For example, program instructions in the control plane and in the program instructions in the forwarding plane may utilize the mapping to obtain information within the interface record in order to avoid of data replication in each control plane and forwarding plane. In additional embodiments, the processor 106 includes or has access to logic 105 configured for sending the received packet to at least one destination based upon information gathered from the interface record stored in shared memory space of the control plane and forwarding plane.

FIG. 1 is intended to depict the representative major components of the networking device 100. Individual components may have greater complexity than represented in FIG. 1, components other than or in addition to those shown in FIG. 1 may be present, and the number, type, and configuration of such components may vary. Several particular examples of such additional complexity or additional variations are disclosed herein; these are by way of example only and are not necessarily the only such variations. The various program components illustrated in FIG. 1 and implementing various embodiments of the invention may be implemented in a number of manners, including using various program instructions, logic, computer applications, routines, components, programs, objects, modules, data structures, etc.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
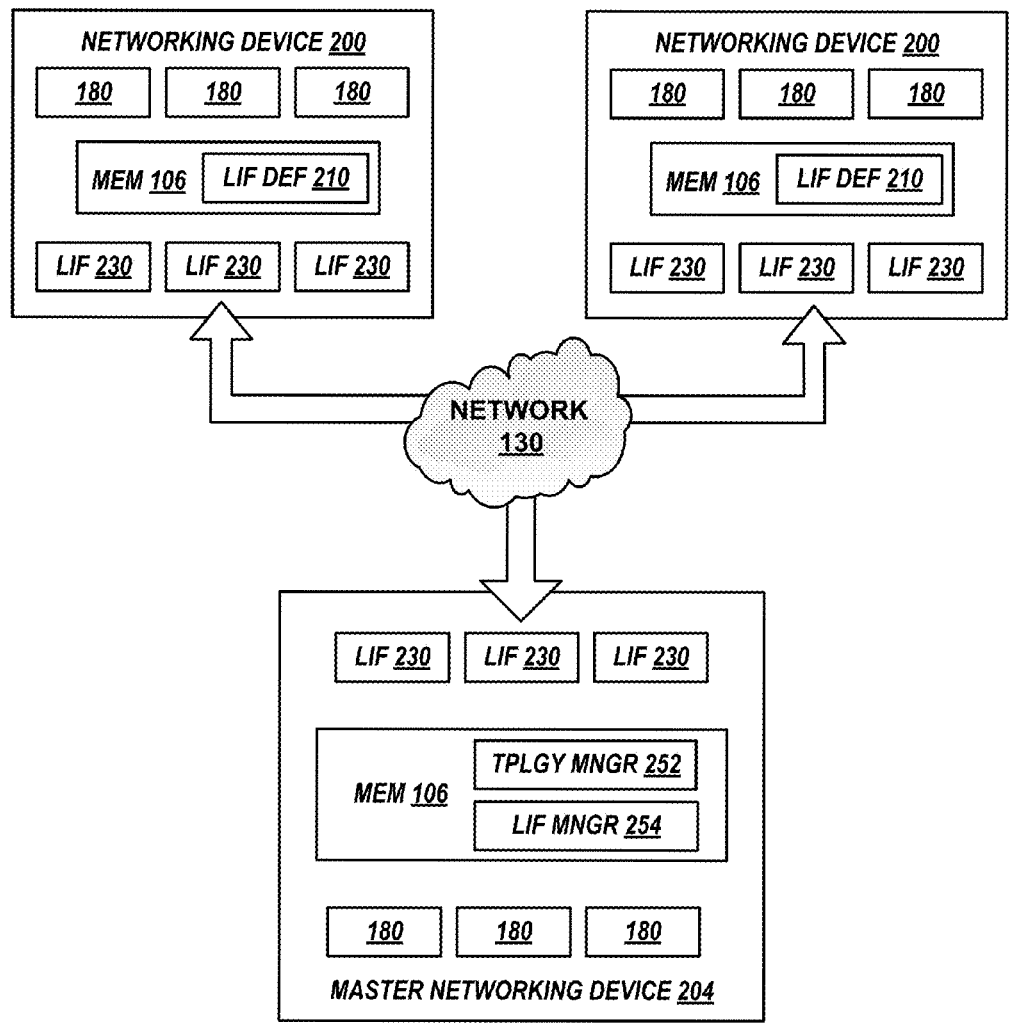
FIG. 2 illustrates a high-level block diagram of of one or more networking devices communicatively connected to a master networking device by a network, according to various embodiments of the present invention.

FIG. 2 illustrates a high-level block diagram of an exemplary embodiment of one or more networking devices 200 communicatively connected to a master networking device 204 by network 130. Network devices 200 and master network device 204 may be switches, routers, hubs, bridges, network blade servers, etc. that transmit and receive data across network 130. Network devices 200 and master network device 204 may comprise some or all of the elements and functionalities of the networking device-100. Master network device 204 is device designated as a managing device that includes e.g. a topology creation manager 252 that may create, manage, etc. control plane system configuration, management, and routing/forwarding table information, etc. and feed such topology information to networking devices 200 and includes a LIF manager 254 that maps an LIF 230 to hardware interface 108, assigns an LIF-ID to the LIF 230, etc. and pushes the mappings to networking devices 200. Network devices 200 implement the topologies created and managed by master network device 204.

Network devices 200 and/or master network device 204 generally transmits data via hardware interfaces 108. From the perspective of applications running upon network devices 200 and/or master network device 204, application data is transmitted via a particular LIF 230 associated with a particular hardware interface 108. In a particular embodiment, multiple LIFs 230 may be associated with a single hardware interface 108 (e.g. multiple channel hardware interface, etc.). Generally LIF 230 is a logical abstraction of hardware interface 108. Mapping occurs between LIF 230 and the associated hardware interface 180. The mapping is created and assigned by LIF manager 254 within master networking device 204 and transmitted to each networking device 200 within network 130. In certain embodiment, the mappings may be transmitted to networking devices 200 via a LIF definition 210 information, file, etc. by master networking device 204. The mapping allows for protocols and applications in the control and forwarding plane to access interface records associated with each LIF 230 that are stored in memory shared by the control plane and forwarding plane. Such efficient storage and retrieval interface records allows for a global unique view of network interfaces, avoidance of data replication in the control plane and forwarding plane, etc. In certain embodiments, the mapping of LIF 230 and the associated hardware interface 180 may occur within a table, utilize a pointer, etc.

Figure 3:
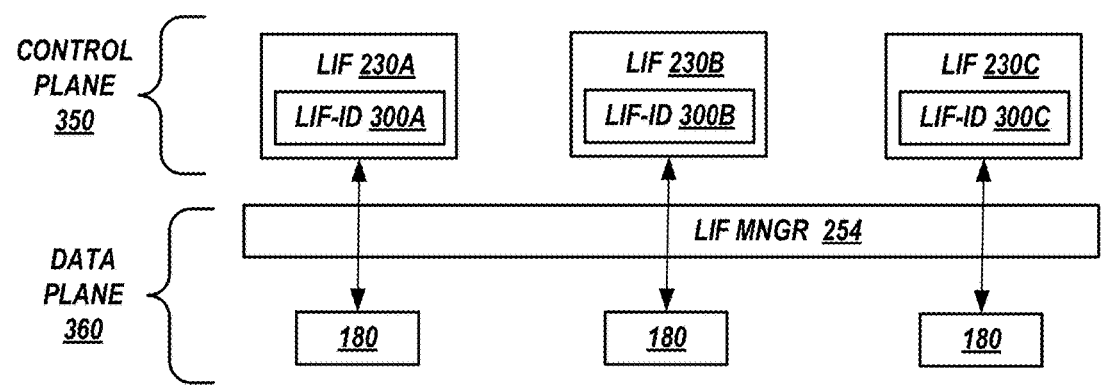
FIG. 3 depicts exemplary mapping of a LIF to a hardware interface, according to embodiments of the invention.

FIG. 3 depicts exemplary mapping of LIF-ID 300 to hardware interface 108 by LIF manager 254. In exemplary embodiments, the mapping by LIF manager 254 may be a logical address to physical address mapping. For example, the LIF manager 254 may link a physical address or other physical identifier of hardware interface 108 to logical interface identifier (LIF-ID) 300. As shown in FIG. 3 the LIF manager 254 may map a first hardware interface 108 to LIF-ID 300A, a second hardware interface 108 to LIF-ID 300B, and a third hardware interface 108 to LIF-ID 300C. In certain embodiments, hardware interface 108 may be generally within forwarding plane 360 and LIFs 230 and LIF manager 254 is included within control plane 350. Therefore, in certain embodiments, LIF manager 254 provides for network 130 interface abstraction and provides global unique view of network 130 interfaces. For instance, each hardware interface 108 within network 130 may be mapped to unique LIF-ID 300 utilized by e.g. applications running on network devices 200. The mapping provided by LIF manager 254 is then utilized by the network device 200 to determine the hardware interface 180 associated with the utilized LIF-ID 300 to which to route, transmit, receive, etc. data.

Figure 4:
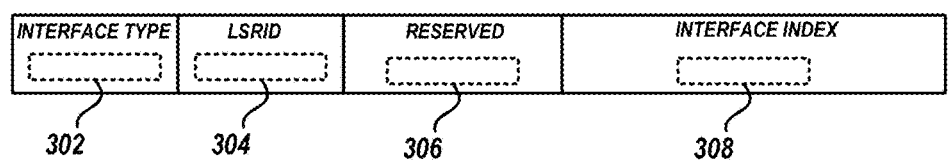
FIG. 4 depicts an exemplary LIF-ID that is utilized by a network device to map to a interface record, according to embodiments of the invention.

FIG. 4 depicts an exemplary LIF-ID 300 that is utilized by a network device to map to a forwarding plane 360 interface record. According to various embodiments of the invention, LIF-ID 300 is associated, tied, or otherwise connected with data that was or is to be transmitted upon network 130. For example, LIF-ID 300 is encoded with or to the data that was or is to be transmitted upon network 130. Generally, LIF-ID 300 identifies and is assigned to a particular LIF 230. Thus, each LIF 230 is associated with a unique LIF-ID 300. In various embodiments, the LIF-ID 300 is assigned the particular LIF 230 for the entirety of the particular LIF 230. In various embodiments, LIF-IDs 300 are assigned to LIFs 230 by LIF manager 254. LIF-IDs 300 may be created and assigned upon the addition of a physical network device to network 130 or, alternatively, by a user creating and assigning the LIF-ID 300, etc. Generally, LIF-IDs 300 are within the extent of control plane 350.

In various embodiments, LIF-ID 300 includes an interface type field that may include an interface type entry 302 that indicates the interface type of an associated LIF 230. In some embodiments the interface type entry 302 may be five bits and/or may indicate the associated hardware interface 108 (e.g. L2 interface, L3 interface, etc.), a multicast interface, a routed virtual LAN (VLAN) interface (RVI), tunnel, etc. to which the LIF 230 is associated.

LIF-ID 300 includes a logical switch router identifier field that may include an identifier entry 304 that identifies the network device the LIF 230 is associated. In some embodiments the identifier entry 304 may be five bits. LIF-ID 300 may also include an index field that may include an index entry 308 that may be utilized to point to an associated interface record stored in memory 110. In some embodiments the identifier entry 308 may be 16 bits. In some embodiments, the LIF-ID 300 may also include a reserved entry 306 (e.g. 6 bits, etc.). As such, LIF-ID 300 may be a 32 bit value.

Figure 5:
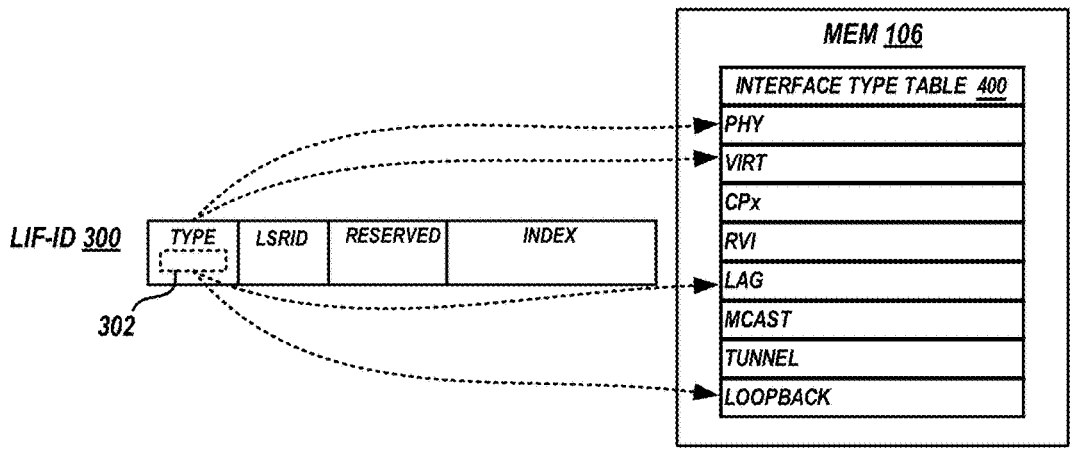
FIG. 5 depicts the utilization of LIF-ID to map to an interface type table stored in memory accessible to control plane and forwarding plane, according to embodiments of the invention.

FIG. 5 depicts the utilization of a LIF-ID 300 to map to an interface type table 400 stored in memory 110 accessible to control plane 350 and forwarding plane 360, according to embodiments of the invention. In certain embodiments, interface type table 400 includes various entries that identify network devices included within network 130 of a given type. In certain embodiments, the entries in interface type table 400 may be similar to entries 302. For example, field 302 may contain one of the values listed in table 400 (PHY, VIRT, CPx, etc). The entries in interface type table 400 may be grouped by similar interface types. In certain embodiments, entry 302 may be utilized to map to particular or associated interface type entry within table 400.

Figure 6:
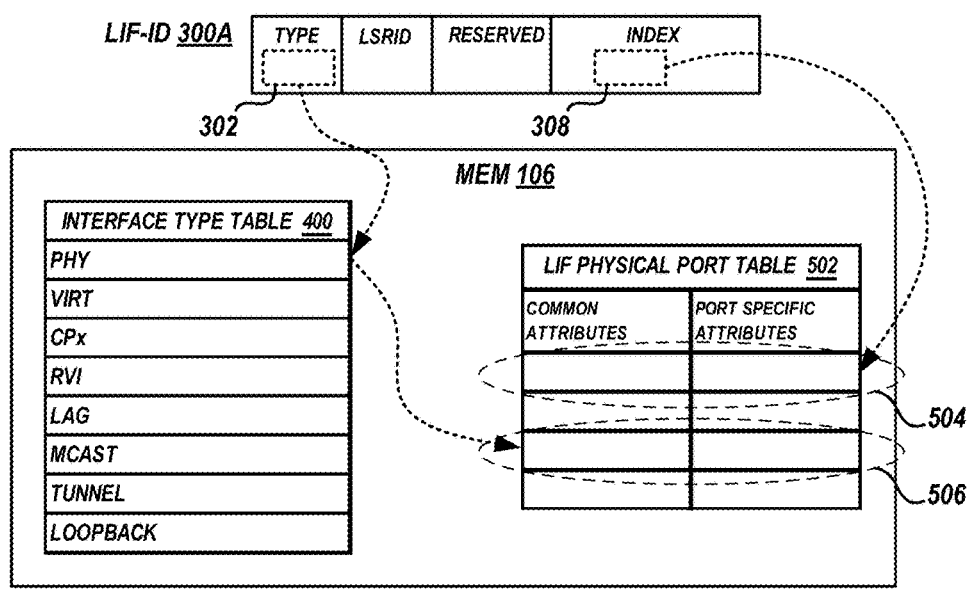
FIG. 6-FIG. 8 depict the utilization of a logical interface identifier to map to an interface record, according to embodiments of the invention.

FIG. 6 depicts the exemplary utilization of LIF-ID 300A to map to an interface record 504, 506 within physical port table 502 stored in memory 110 accessible to control plane 350 and forwarding plane 360, according to embodiments of the invention. In certain embodiments, entry 302 within LIF-ID 300A is used to retrieve the table that which the index 308 identifies. Entry 308 within LIF-ID 300A maps to an interface record 504 within physical port table 502. Interface records 504, 506 may include common attribute information and port specific information. In certain embodiments interface records 504, 506 may include one or more common attribute entries associated with each respective physical port: physical port identifier (e.g. a command line unique identifier, etc.), physical interface state (e.g. active, inactive, etc.), IP address, number of application interested in the physical port, etc. In certain embodiments interface records 504, 506 may include one or more physical port specific attribute entry(ies): physical port speed, duplex mode, server uplink, switch unit slot, access control list, etc. Further, the common attribute entries and port specific attribute entries may be information commonly accessed by multiple applications running upon network devices 200, 204, etc. As such, a LIF-ID 300 within control plane 350 may be mapped to an interface record within forwarding plane 360.

Figure 7:
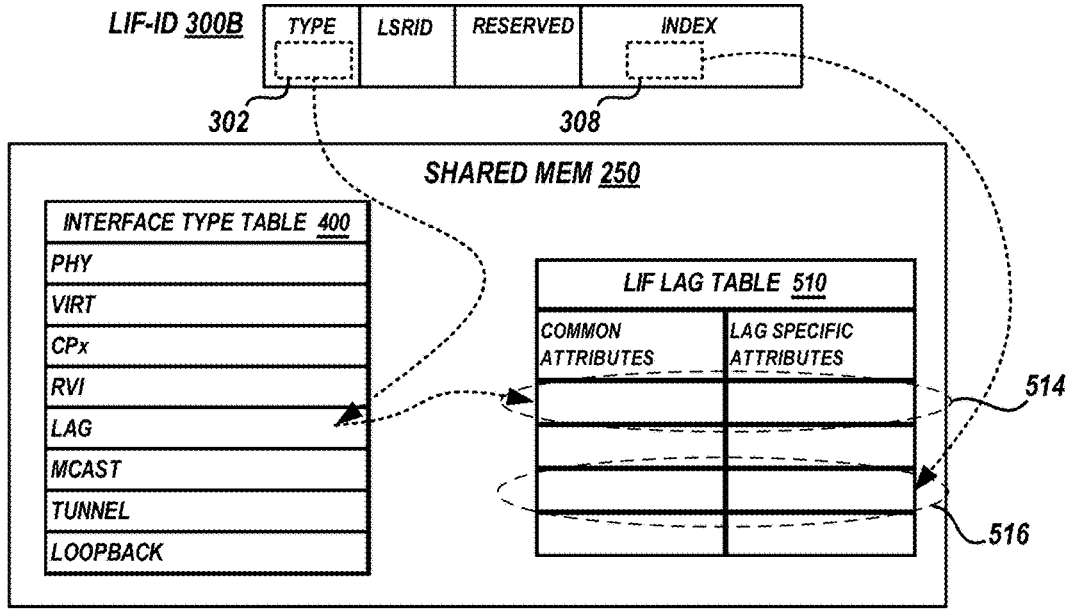

FIG. 7 depicts the exemplary utilization of LIF-ID 300B to map to an interface record 514, 516 within LAG table 510 stored in memory 110 accessible to control plane 350 and forwarding plane 360, according to embodiments of the invention. Entry 308 within LIF-ID 300B directly maps to an interface record 516 within LAG table 510. Interface records 514, 516 include common attribute information and LAG specific information. In certain embodiments interface records 514, 516 may include one or more common attribute entries associated with each respective LAG: LAG identifier (e.g. a command line unique identifier, etc.), interface state (e.g. active, inactive, etc.), IP address(es), number of applications 160 interested in the LAG, etc. In certain embodiments interface records 514, 516 includes one or more LAG specific attribute entry(ies): LAG members, LACP key, LAG ID, etc.

Figure 8:
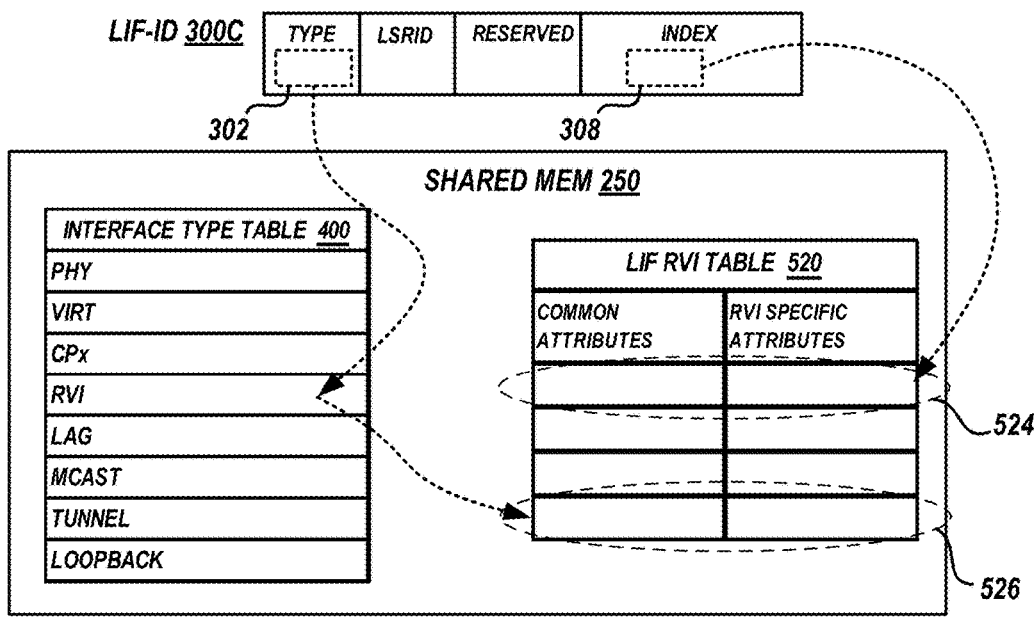

FIG. 8 depicts the exemplary utilization of LIF-ID 300C to map to an interface record 524, 526 within RVI table 520 stored in memory 110 accessible to control plane 350 and forwarding plane 360, according to embodiments of the invention. Entry 308 within LIF-ID 300C directly maps to an interface record 5124 within RVI table 520. Interface records 524, 526 may include common attribute information and RVI specific information. In certain embodiments interface records 524, 526 may include one or more common attribute entries associated with each respective RVI: RVI identifier (e.g. a command line unique identifier, etc.), interface state (e.g. active, inactive, etc.), IP address(es), number of applications 160 interested in the RVI, etc. In certain embodiments interface records 524, 526 may include one or more RVI specific attribute entry(ies): VLAN ID, etc.

An interface record is an entry in one of the tables 502, 510, 520 and may contain common and specific interface attributes, depending on the interface type. The interface type 302 and interface index 308 are used to locate the interface record.

Though a physical port table 502, LAG table 510, and RVI table 520 are shown it is to be understood that other attribute tables are associated with group of table 400. Therefore, an attribute table may exist for virtual port, CPx, multicast, tunnel, loopback, etc. within shared memory 250. In the implementation of various attribute tables stored within shared memory 250 allows for an application to store application specific value(s) within a common attribute portion of an interface record identifying application 160 specific data stored within associated memory space 110. Therefore, in certain embodiments, the application need store only application 160 specific information within its application space of memory 102. Generally, LIF-ID 300 allows for a fast retrieval of an interface record. For example, entry 304 allows for immediate retrieval of the associated LIF 230 and/or the interface record in shared memory 250. Such retrieval allows for efficient storage and eliminates the need for complex data structures that track LIF assignments.

Figure 9:
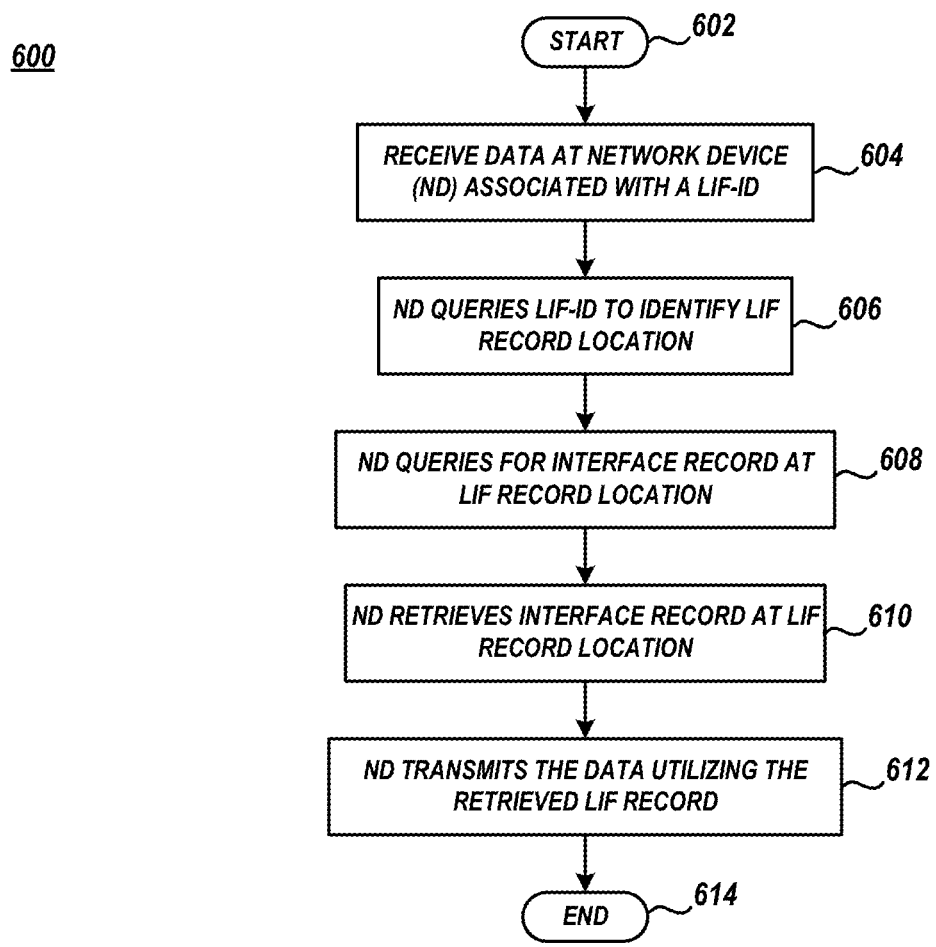
FIG. 9 depicts an exemplary method of transmitting data associated with a LIF-ID, according to embodiments of the invention.

FIG. 9 depicts an exemplary method 600 of transmitting data associated with a LIF-ID 300 according to embodiments of the invention. Method 600 begins at block 602 and may continue with networking device receiving data associated with a LIF-ID 300 (block 604). For example, a processor 106 within network device 200 may receive a data packet upon a hardware interface 108 via network 130.

Method 600 may continue with the networking device querying the LIF-ID 300 to identify the location of a LIF record stored in memory 110 accessible to control plane 350 and forwarding plane 360. In a first embodiment, the location may be determined by a mapping such that an entry 302 within LIF-ID 300 maps to an entry within interface type table 400 which, in turn, maps to an interface record within an associated attribute table. In a second embodiment the location may be determined by a mapping such that entry 308 within LIF-ID 300 maps to the interface record within the associated attribute table. Method 600 may continue with the networking device querying for the interface record at the determined interface record location (block 608).

Method 600 may continue with the networking device retrieving the interface record from the memory 110 accessible to control plane 350 and forwarding plane 360 at the determined interface record location (block 610). For example, the networking device retrieves the mapped interface record. Method 600 may continue with the networking device transmitting the data based upon at least a portion of the interface record (block 612). For example, the networking device may route the received data to a second hardware interface 108 that may in turn be routed across network 130. Method 600 ends at block 614.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over those found in the marketplace, or to enable others of ordinary skill in the art to understand the embodiments disclosed herein.

What is claimed is:

1. A network system comprising:
    a master network switch and a first network switch controlled by the master network switch:
    the master network switch comprising:
    a logical interface map stored in a first memory accessible to the master network switch control plane and the master network switch forwarding plane, the logical interface map comprising an interface type table comprising a plurality of hardware interface types and a plurality of logical interface tables, each logical interface table associated with a particular hardware interface type;
    a topology creation manager that manages a forwarding table within the master network switch control plane;
    a logical interface (LIF) manager that forms the logical interface map that maps hardware interfaces of the first network switch to a respective LIF, each LIF comprising an LIF identifier (LIF-ID), the LIF-ID comprising an interface type entry that identifies the hardware interface type of the respective hardware interface and points to the hardware interface type of the the respective hardware interface within the interface type table, a switch identifier entry that identifies the first network switch, and an interface index entry that points to an interface record within a particular logical interface table associated with the hardware interface type of the respective hardware interface, the interface record comprising common attribute information that is common to all hardware interfaces of the same type as the respective interface and respective interface specific information that is unique to only the respective interface;
    the first network switch comprising:
    a processor and second memory comprising first program instructions in the first network switch control plane, second program instructions in the first network switch forwarding plane, the forwarding table received from the master networking device, and the logical interface map received from master networking device, wherein the local logical interface map is stored in memory accessible to the first program instructions and second program instructions such that the first program instructions and the second program instructions both access respective interface records of respective LIF-IDs of the first network switch when evoked by the processor of the first network switch; and
    wherein the processor of the first network switch transmits network data received upon a first hardware interface to a second hardware interface of the first network switch based upon the forwarding table and based upon the second hardware interface specific information obtained from the access of the interface record of the second hardware interface.

2. The network system of claim 1, wherein each hardware interface of the first network switch is mapped to a respective LIF comprising a unique LIF-ID.

3. The network system of claim 1, wherein the LIF manager communicates the logical interface map also to a second network switch.

4. The network system of claim 1, wherein the LIF-ID is comprised within the master network switch control plane and within the first network switch control plane and the LIF manager is comprised within the master network switch forwarding plane and within the first network switch forwarding plane.

5. The networked system of claim 1, wherein each LIF-ID is a 32 bit value and wherein respective interface index entries are 16 bit values.

6. A method for transmitting network data comprising:
receiving, with a network switch, a logical interface map from a master network switch that controls the network switch, the logical interface map comprising an interface type table comprising a plurality of hardware interface types and a plurality of logical interface tables, each logical interface table associated with a particular hardware interface type;
storing the logical interface map within memory accessible to the network switch control plane and the network switch forwarding plane, wherein the logical interface map maps hardware interfaces of the network switch to a respective LIF, each LIF comprising a unique LIF identifier (LIF-ID), each LIF-ID comprising an interface type entry that identifies the hardware interface type of the respective hardware interface and points to the hardware interface type of the respective hardware interface within the interface type table, a switch identifier entry that identifies the network switch, and an interface index entry that points to an interface record within a particular logical interface table associated with the hardware interface type of the respective hardware interface, the interface record comprising common attribute information that is common to all hardware interfaces of the same type as the respective interface and respective interface specific information that is unique to only the respective interface;
receiving, with the network switch, a forwarding table from master network switch and storing the forwarding table within the network switch control plane;
receiving data at the network switch upon a first hardware interface communicatively connected to a network;
accessing, with a processor of the network switch evoking first program instructions of the network switch control plane, an interface record of a second hardware interface of the network switch;
accessing, with the processor of the network switch evoking second program instructions of the network switch forwarding plane, the interface record of the second hardware interface of the network switch; and
transmitting the received data to the second hardware interface of the network switch utilizing second hardware interface specific information obtained from the accessed interface record of the second hardware interface and utilizing the forwarding table.

7. The method of claim 6 wherein each LIF-ID of the hardware interfaces of the network switch is comprised within the network switch control plane.

8. A computer program product for transmitting network data, the computer program product comprising a non-transitory computer readable storage medium having program instructions embodied therewith, the program instructions readable to:
receive, at a network switch, a logical interface map from a master network switch that controls the network switch, the logical interface map comprising an interface type table comprising a plurality of hardware interface types and a plurality of logical interface tables, each logical interface table associated with a particular hardware interface type;
store the logical interface map within memory accessible to the network switch control plane and the network switch forwarding plane, wherein the logical interface map maps hardware interfaces of the network switch to a respective LIF, each LIF comprising a unique LIF identifier (LIF-ID), each LIF-ID comprising an interface type entry that identifies the hardware interface type of the respective hardware interface and points to the hardware interface type of the respective hardware interface within the interface type table, a switch identifier entry that identifies the network switch, and an interface index entry that points to an interface record within a particular logical interface table associated with the hardware interface type of the respective hardware interface, the interface record comprising common attribute information that is common to all hardware interfaces of the same type as the respective interface and respective interface specific information that is unique to only the respective interface;
receive, at the network switch, a forwarding table from master network switch and store the forwarding table within the network switch control plane;
receive data at the network swith upon a first hardware interface of the network switch;
access, with a processor of the network switch evoking first program instructions of the network switch control plane, an interface record of a second hardware interface of the network switch;
access, with the processor of the network switch evoking second program instructions of the network switch forwarding plane, the interface record of the second hardware interface of the network switch; and
transmit the received data to the second hardware interface of the network switch utilizing second hardware interface specific information obtained from the accessed interface record of the second hardware interface and utilizing the forwarding table.

9. The computer program product of claim 8, wherein each LIF-ID of the hardware interfaces of the network switch is comprised within the network switch control plane.

* * * * *